US006985656B2

(12) United States Patent
Iazikov et al.

(10) Patent No.: US 6,985,656 B2
(45) Date of Patent: Jan. 10, 2006

(54) TEMPERATURE-COMPENSATED PLANAR WAVEGUIDE OPTICAL APPARATUS

(75) Inventors: Dmitri Iazikov, Springfield, OR (US); Thomas W. Mossberg, Eugene, OR (US); Christoph M. Greiner, Eugene, OR (US)

(73) Assignee: LightSmyth Technologies Inc, Eugene, OR (US)

( * ) Notice: Subject to any disclaimer, the term of this patent is extended or adjusted under 35 U.S.C. 154(b) by 96 days.

(21) Appl. No.: 10/794,634

(22) Filed: Mar. 5, 2004

(65) Prior Publication Data

US 2004/0170356 A1    Sep. 2, 2004

Related U.S. Application Data

(63) Continuation-in-part of application No. 09/811,081, filed on Mar. 16, 2001, now Pat. No. 6,879,441, application No. 10/794,634, which is a continuation-in-part of application No. 10/653,876, filed on Sep. 2, 2003, now Pat. No. 6,829,417, which is a continuation-in-part of application No. 10/229,444, filed on Aug. 27, 2002, now Pat. No. 6,678,429.

(60) Provisional application No. 60/486,450, filed on Jul. 10, 2003, provisional application No. 60/468,479, filed on May 7, 2003, provisional application No. 60/452,834, filed on Mar. 6, 2003, provisional application No. 60/370,182, filed on Apr. 4, 2002, provisional application No. 60/247,231, filed on Nov. 10, 2000, provisional application No. 60/235,330, filed on Sep. 26, 2000, provisional application No. 60/199,790, filed on Apr. 26, 2000, provisional application No. 60/190,126, filed on Mar. 16, 2000.

(51) Int. Cl.
G02B 6/34    (2006.01)
G02B 5/18    (2006.01)

(52) U.S. Cl. .............................. 385/37; 385/3; 385/10; 385/14; 359/569; 359/565

(58) Field of Classification Search .................. 385/1, 385/3, 8–10, 14, 36, 37, 123, 576; 359/565, 359/566, 569, 570
See application file for complete search history.

(56) References Cited

U.S. PATENT DOCUMENTS

| 6,678,429 B2 * | 1/2004 | Mossberg et al. ............. 385/10 |
| 6,829,417 B2 * | 12/2004 | Greiner et al. ................ 385/37 |
| 6,879,441 B1 * | 4/2005 | Mossberg .................... 359/569 |

* cited by examiner

*Primary Examiner*—Phan T. H. Palmer
(74) *Attorney, Agent, or Firm*—David S. Alavi (57) ABSTRACT

An optical apparatus (spectral filter, temporal encoder, or other) comprises a planar optical waveguide having at least one set of diffractive elements. Each diffractive element set routes by diffraction therefrom a portion of the optical signal propagating in the planar waveguide. The planar waveguide includes at least one material having thermo-optic properties chosen so as to yield a designed temperature dependence of spectral and/or temporal characteristics of the diffracted portion of the optical signal. Variations of material refractive indices, physical dimensions, and/or optical mode distributions with temperature may at least partly compensate one another to yield the designed temperature dependence. Optical materials with $\partial n/\partial T$ of various magnitudes and signs may be variously incorporated into the waveguide core and/or cladding. The designed temperature dependence may be: i) substantial temperature independence; ii) a temperature derivative of zero at a selected temperature; or iii) a designed variation with respect to temperature.

51 Claims, 6 Drawing Sheets

TEMPERATURE-COMPENSATED PLANAR WAVEGUIDE OPTICAL APPARATUS

RELATED APPLICATIONS

1) This application is a continuation-in-part of prior-filed non-provisional app. Ser. No. 09/811,081 entitled "Holographic spectral filter" filed Mar. 16, 2001 now U.S. Pat. No. 6,879,441 in the name of Thomas W. Mossberg, which in turn claims benefit of provisional App. No. 60/190,126 filed Mar. 16, 2000, provisional App. No. 60/199,790 filed Apr. 26, 2000, provisional App. No. 60/235,330 filed Sep. 26, 2000, and provisional App. No. 60/247,231 filed Nov. 10, 2000. Each of said provisional and non-provisional patent applications is hereby incorporated by reference as if fully set forth herein. 2) This application is a continuation-in-part of prior-filed non-provisional app. Ser. No. 10/653,876 entitled "Amplitude and phase control in distributed optical structures" filed Sep. 2, 2003 now U.S. Pat. No. 6,829,417 in the names of and Christoph M. Greiner, Dmitri Iazikov, and Thomas W. Mossberg, which in turn is a continuation-in-part of non-provisional app. Ser. No. 10/229,444 entitled "Amplitude and phase control in distributed optical structures" filed Aug. 27, 2002 in the names of Thomas W. Mossberg and Christoph M. Greiner, now U.S. Pat. No. 6,678,429 issued Jan. 13, 2004, which in turn claims benefit of provisional App. No. 60/315,302 filed Aug. 27, 2001 and provisional App. No. 60/370,182 filed Apr. 4, 2002. app. Ser. No. 10/653,876 also claims benefit of provisional App. No. 60/468,479 filed May 7, 2003 and provisional App. No. 60/486,450 filed Jul. 10, 2003. Each of said provisional and non-provisional patent applications is hereby incorporated by reference as if fully set forth herein. 3) This application claims benefit of prior-filed co-pending provisional App. No. 60/452,834 entitled "Athermal holographic spectral filter and method of designing thereof" filed Mar. 6, 2003 in the names of Dmitri Iazikov, Thomas W. Mossberg, and Christoph M. Greiner, said provisional patent application being hereby incorporated by reference as if fully set forth herein.

BACKGROUND

The field of the present invention relates to optical devices incorporating distributed optical structures and temperature compensation. In particular, temperature-compensated planar waveguide optical apparatus, including spectral filters and temporal encoders, are disclosed herein.

An optical apparatus comprising a planar waveguide incorporating one or more distributed optical structures (i.e., one or more sets of diffractive elements) may be configured to provide a variety of optical functionality, including spectral filtering, temporal encoding, and others. Such devices, if single mode, may enable nearly complete control of amplitude and phase of optical signals to achieve filtering, encoding, routing, and other functions. Multimode devices may be employed for similar applications. Examples of such devices may be found in the prior applications cited hereinabove. However, the transfer functions of such devices exhibit shifts in wavelength with changes in the device's temperature, which may be caused, for example, by temperature-dependent changes in the refractive indices of the materials forming the planar waveguide and/or temperature-dependent changes in the mechanical dimensions of the waveguide (characterized by a so-called thermal expansion coefficient).

A typical value of the wavelength shift for a planar waveguide spectral filter implemented in a silica slab waveguide is 0.01 nm/° C. In many practical applications spectral filters have full-width-at-half-maximum (FWHM) bandpass windows of fractions of a nanometer and operate between about −5° C. and about 75° C. In such applications, the change in the ambient temperature within said limits will result in a wavelength shift of the center of the passband(s) of approximately 0.8 nm, which may be comparable to or larger than the passband of the filter. Such a relatively large temperature shift in passband center may necessitate external active thermal stabilization of the spectral filter, using thermal sensors, feedback controllers, and heating and/or cooling elements (such as Peltier elements). Use of such thermal stabilization apparatus adds substantial device cost, may lower device reliability, and may reduce wavelength accuracy. It may therefore be desirable to provide a planar waveguide optical apparatus with a designed temperature dependence for its spectral and/or temporal characteristics (which may include characteristics independent of temperature, or nearly so, or characteristics exhibiting some other desired temperature tuning characteristics). Devices with designed temperature dependence, particularly those with substantially reduced temperature dependence, may enable operation without thermal stabilization.

SUMMARY

An optical apparatus comprises a planar optical waveguide having at least one set of diffractive elements. The planar optical waveguide substantially confines in at least one transverse spatial dimension an optical signal propagating therein, and may be a slab waveguide (equivalently, a 2D waveguide, substantially confining in one transverse dimension an optical signal propagating in two dimensions therein) or a channel waveguide (equivalently, a 1D waveguide, substantially confining in two transverse dimensions an optical signal propagating therein). Each diffractive element set routes, between a corresponding input optical port and a corresponding output optical port, a corresponding diffracted portion of the optical signal propagating in the planar waveguide that is diffracted by the diffractive element set. The planar waveguide includes at least one material having thermo-optic properties chosen so as to yield a designed temperature dependence of spectral and/or temporal characteristics of the diffracted portion of the optical signal.

Variations of material refractive indices, physical dimensions, and/or optical mode distributions with temperature may at least partly compensate one another to yield the designed temperature dependence. Optical materials, including thermo-optic materials, may be incorporated in various ways into the core and/or cladding of the planar waveguide and/or into the diffractive elements, and may have $\partial n/\partial T$ of various magnitudes and signs. The designed temperature dependence of spectral and/or temporal characteristics may be: i) substantial temperature independence over an operating temperature range; ii) a temperature derivative (i.e., the rate of change of a device parameter or performance characteristic with respect to temperature) equal to zero at a selected temperature in an operating temperature range; or iii) a designed variation with respect to temperature. The optical apparatus may function as a spectral filter with a designed temperature dependence of its spectral profile. The optical apparatus may function as a temporal encoder with a designed temperature dependence of its temporal characteristics.

Objects and advantages pertaining to temperature-compensated planar waveguide optical apparatus may become

The embodiments shown in the Figures are exemplary, and should not be construed as limiting the scope of the present disclosure and/or appended claims.

DETAILED DESCRIPTION OF EMBODIMENTS

An optical apparatus according to the present disclosure comprises a planar optical waveguide having at least one set of diffractive elements. The planar optical waveguide substantially confines in at least one transverse dimension optical signals propagating therein. The planar waveguide may comprise a slab waveguide (equivalently, a 2D waveguide, substantially confining in one transverse dimension an optical signal propagating in two dimensions therein) or a channel waveguide (equivalently, a 1D waveguide, confining in two transverse dimensions an optical signal propagating therein). It should be noted that the term "planar waveguide" is not consistently employed in the prior art with respect to the distinction between slab and channel waveguides. The planar waveguide typically comprises a core surrounded by lower-index cladding. The core is fabricated using one or more dielectric materials substantially transparent over a desired operating wavelength range. In some instances the cladding may include vacuum, air, or other ambient atmosphere. More typically, the cladding comprises dielectric material(s). (In some instances in which short optical paths are employed and some degree of optical loss can be tolerated, the cladding indices might be larger than the core index while still enabling the planar waveguide to support guided, albeit lossy, optical modes.) The planar waveguide may be secured to a substrate, for facilitating manufacture, for mechanical support, and/or for other reasons.

The set of diffractive elements of the planar waveguide optical filter may also be referred to as: a distributed optical structure; a set of holographic elements; a volume hologram; a distributed reflective element, distributed reflector, or distributed Bragg reflector (DBR); a Bragg reflective grating (BRG); a holographic Bragg reflector (HBR); a distributed Bragg structure; mode-selective photonic bandgap crystal; directional photonic bandgap material; or other equivalent terms of art. Each diffractive element of the set diffracts, reflects, scatters, or otherwise redirects a portion of an incident optical signal (said process hereinafter simply referred to as diffraction). Each diffractive element of the set typically comprises some suitable alteration of the planar waveguide (ridge, groove, index modulation, density modulation, and so on). In a slab waveguide, each diffractive element is spatially defined by a virtual two-dimensional linear and/or curvilinear diffractive element contour, the shapes of the contours (linear and/or curvilinear) typically being configured to impart desired spatial characteristics onto the diffracted portion of the optical signal. The diffractive elements of the set (or equivalently, in a 2D waveguide, the corresponding contours) are spatially arranged with respect to one another so that the corresponding portions of the optical signal diffracted by each element interfere with one another, so as to impart desired spectral and/or temporal characteristics onto the portion of the optical signal collectively diffracted from the set of diffractive elements. The diffractive elements in the set are arranged so that an input optical signal, entering the planar waveguide through an input optical port, is successively incident on diffractive elements of the set (i.e., a fraction of the incident amplitude is diffracted by a diffractive element while the remainder is transmitted and incident on another diffractive element, and so on successively through the set of diffractive elements). The diffractive elements are therefore spaced substantially longitudinally along the propagation direction of the incident optical signal (in contrast to a traditional surface or thin diffraction grating, in which the diffractive elements, i.e. grating lines, are spaced transversely across the wavefront of the incident optical signal). In a slab waveguide, each linear and/or curvilinear diffractive element is shaped to direct its diffracted portion of the optical signal to an output optical port, typically (but not necessarily) propagating back through earlier diffractive elements of the set. The relative spatial arrangement (i.e. longitudinal spacing) of the diffractive elements of the set yields (at least in part) desired spectral and/or temporal characteristics for the overall diffracted optical signal reaching the output optical port. It should be noted that optical ports (input and/or output) may be defined structurally (for example, by an aperture, waveguide, fiber, lens, or other optical component) and/or functionally (i.e., by a spatial location and propagation direction). For a single-mode planar waveguide, a set of diffractive elements may be arranged to yield an arbitrary spectral transfer function (in terms of amplitude and phase). In a multimode planar waveguide, modal dispersion and mode-to-mode coupling of diffracted portions of the optical signal may limit the range of spectral transfer functions that may be implemented.

The set of diffractive elements of a slab planar waveguide optical apparatus provides dual functionality, spatially routing a diffracted portion of an optical signal between an input optical port and an output optical port, while at the same time imparting designed spectral and/or temporal characteristics onto the diffracted portion of the optical signal. The linear and/or curvilinear diffractive elements may be designed (by computer generation, for example) so as to provide optimal routing, imaging, or focusing of the optical signal between an input optical port and a desired output optical port, thus reducing or minimizing insertion loss of the spectral filter. Simple linear and/or curvilinear diffractive elements (segments of lines, circles, ellipses, parabolas, hyperbolas, and so forth), if not optimal, may be employed as approximations of fully spatially optimized contours. A wide range of fabrication techniques may be employed for forming sets of diffractive elements of various sorts, and any suitable technique(s) may be employed while remaining within the scope of the present disclosure and/or appended claims. The following are exemplary only, and are not intended to be exhaustive.

Diffractive elements may be formed lithographically on the surface of a planar optical waveguide, or at one or both interfaces between core and cladding of a planar optical waveguide. Diffractive elements may take the form of trenches or ribs at the surface of the core, with material of differing index filling the trenches or the spaces between the ribs (the filling material may be cladding material, or some other optical material). Diffractive contours may be formed lithographically in the interior of the core layer of the planar optical waveguide using one or more spatial lithography steps performed after an initial deposition of core layer material. Diffractive elements may be formed by projecting ultraviolet light or other suitable radiation through an amplitude and/or phase mask so as to create an interference pattern within the planar waveguide (fabricated at least in part with suitably sensitive material) whose fringe contours match the desired diffractive element contours. Alteration of the refractive index by exposure to ultraviolet or other radiation results in index-modulated diffractive elements. The mask may be zeroth-order-suppressed according to methods known in the art, including the arts associated with fabrication of fiber Bragg gratings. The amplitude and/or phase mask may be produced lithographically via laser writer or e-beam, it may be interferometrically formed, or it may be formed by any other suitable technique. In instances where resolution is insufficient to produce a mask having required feature sizes, a larger scale mask may be produced and reduced to needed dimensions via photoreduction lithography, as in a stepper, to produce a mask at the needed scale. Diffractive elements may be formed by molding, stamping, impressing, embossing, or other mechanical processes. Many approaches to the creation of refractive index modulations or gratings are known in the art and may be employed in the fabrication of diffractive element sets.

Irradiation-produced refractive index modulations or variations for forming diffractive elements will optimally fall in a range between about $10^{-4}$ and about $10^{-1}$; however, refractive index modulations or variations outside this range may be employed as well. Refractive index modulations or variations may be introduced by light of any wavelength (including ultraviolet light) that produces the desired refractive index changes, provided only that the photosensitive material employed is suitably stable in the presence of light in the desired operating wavelength range of the spectral filter. Exposure of a complete set of diffractive elements to substantially spatially uniform, refractive-index-changing light may be employed to tune the operative wavelength range of the diffractive element set. Exposure of the diffractive element set to spatially non-uniform refractive-index changing light may be employed to chirp or otherwise wavelength-modulate the spectral filter.

Figure 1A:
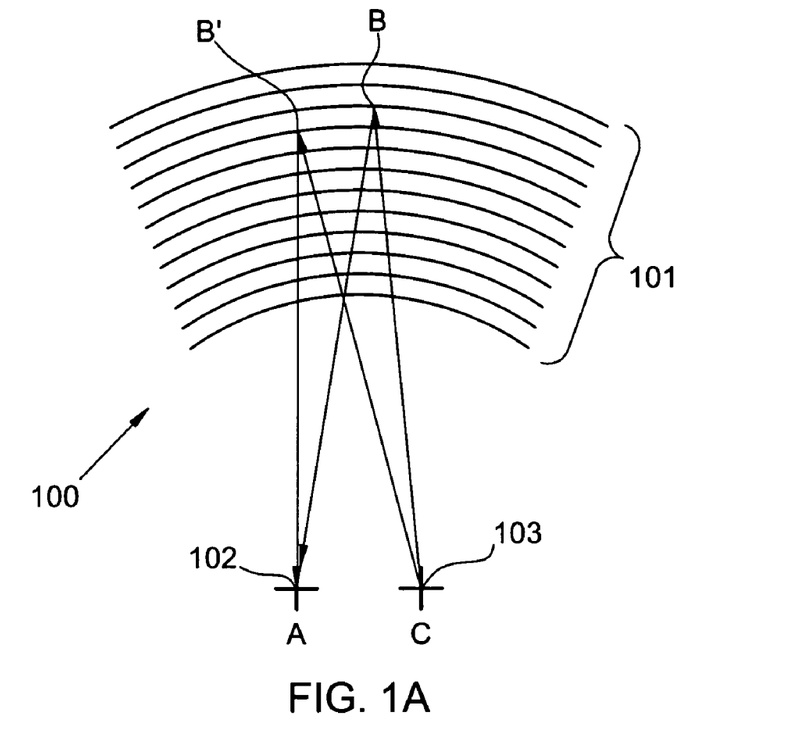
FIGS. 1A and 1B are schematic views of a slab (1A) and channel (1B) waveguides with diffractive elements.
Figure 1B:
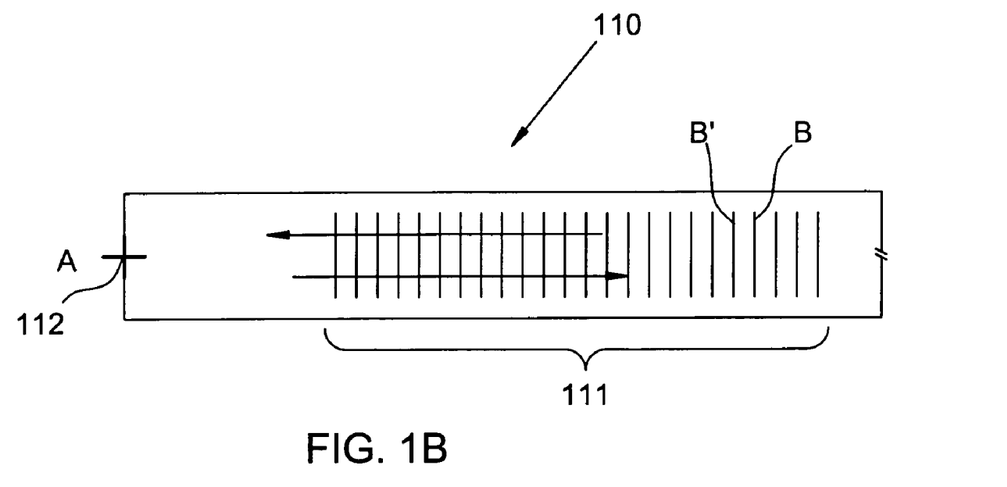

The transfer function (spectral and/or temporal) of the planar waveguide optical apparatus depends on coherent interference of corresponding portions of the optical signal diffracted from the diffractive elements of the planar waveguide. The result of the interference for specific vacuum wavelength λ depends on relative phase Δϕ of the optical signal diffracted from different diffractive elements. In FIG. 1A, this is illustrated in a top schematic view of an exemplary slab waveguide 100 with a set of diffractive elements 101, which route a portion of an optical signal between optical ports 102 and 103 (points A and C, respectively). In FIG. 1B, this is illustrated in a schematic view of a channel waveguide 110 with a set of diffractive elements 111, which route a portion of an optical signal from optical port 112 back to optical port 112 (input and output ports marked by point A coincide in the case of a channel waveguide). Points of diffraction from two diffractive elements are represented by points B and B'. The relative phase between portions of the optical signal diffracted from points B and B' is calculated as:

$$\Delta\varphi = \frac{2\pi}{\lambda} n_{mod} \Delta L, \tag{1}$$

where ΔL is the difference in length between paths ABC and AB'C in the slab waveguide 100 (between paths ABA and AB'A in channel waveguide 110), and $n_{mod}$ is the effective refractive index of the specific waveguide mode of the planar waveguide optical apparatus. The effective refractive index, $n_{mod}$, is a function of the detailed waveguide geometry as well as the bulk indices, $n_i$, of the materials comprising the planar waveguide (core material(s) and cladding material(s)).

The condition for constructive interference at a resonance wavelength, $\lambda_{res}$, between the portions of the optical signal diffracted from points B and B' within the planar waveguide is given by Δϕ=2πm, where m=1, 2, 3, . . . is an integer, so $$\lambda_{res} = \frac{n_{mod} \Delta L}{m}. \tag{2}$$

The dependence of $\lambda_{res}$ on the temperature T is obtained by differentiating the above equation:

$$\frac{\partial \lambda_{res}}{\partial T} = \frac{1}{m}\left(\Delta L \frac{\partial n_{mod}}{\partial T} + n_{mod} \frac{\partial \Delta L}{\partial T}\right) = \frac{\Delta L}{m}\left(\frac{\partial n_{mod}}{\partial T} + n_{mod}\alpha\right), \tag{3}$$

where α is defined as an effective thermal expansion coefficient of the planar waveguide. To achieve independence of a resonance wavelength of the planar waveguide optical apparatus from the temperature (i.e., substantially athermal operation), the following equation should be satisfied:

$$\left(\frac{\partial n_{mod}}{\partial T} + n_{mod}\alpha\right) = 0. \tag{4}$$

If the planar waveguide is formed of k layers with refractive indices $n_1, n_2, \ldots, n_k$, then $n_{mod}$ is a function of the refractive indexes of the layers and their relative geometry, i. e.

$$n_{mod} = n_{mod}(n_1, n_2, \ldots, n_k). \tag{5}$$

In the region of the planar waveguide where the diffractive elements are formed, the refractive index may be averaged over a period of the diffractive element set. Alternatively, an exact mode solution may be found based on the detailed structure of the individual diffractive elements. The derivative of $n_{mod}$ with temperature can then be written generally as $$\frac{\partial n_{mod}(n_1, n_2, \ldots, n_k)}{\partial T} = \sum_{i=1}^{k} \varepsilon_i \frac{\partial n_i}{\partial T}, \quad (6)$$

where $$\varepsilon_i = \frac{\partial n_{mod}}{\partial n_i}. \quad (7)$$

The values of the $\varepsilon_i$ depend on all the material indices and the detailed waveguide geometry. The values of the $\varepsilon_i$ parameters can be determined by standard calculational algorithms known in the art. The values of $\partial n_i/\partial T$ are characteristic of the materials utilized in the construction of the planar waveguide structure. The condition for substantially athermal operation may be re-written as:

$$\sum_{i=1}^{k} \varepsilon_i \frac{\partial n_i}{\partial T} + n_{mod}\alpha = 0. \quad (8)$$

The last equation provides a rule for designing substantially athermal planar waveguide optical devices. It is seen that by choosing materials with appropriate values of $n_i$ and $\partial n_i/\partial T$ (possibly including at least one pair of materials having $\partial n/\partial T$ of opposite signs), accounting for the thermal expansion/contraction of the waveguide if necessary ($n_{mod}\alpha$ term in Eq. 8), and adjusting the design parameters $\varepsilon_i$ (by varying the dimensions of the layers forming the planar waveguide, the detailed configuration and dimensions of the diffractive elements, and the spacing of the diffractive elements), one can achieve substantial independence of the planar waveguide device transfer function from the temperature (at least at one temperature where the Eq. 8 is satisfied). Note that in certain exemplary embodiments, the thermo-optic coefficient (i.e., $\partial n_i/\partial T$) of material filling trenches formed in the waveguide, or material confined to a thin layer, may differ from that of the bulk material. It may be necessary to account for any such difference.

Satisfying the athermal condition (Eq. 8) at a specific temperature within an operating range will not necessarily ensure that the device spectral/temporal characteristics will remain constant throughout the entire operating temperature range. All terms of Eq. 8 may vary with temperature. Suitable choice of a waveguide structure may be employed to balance the respective temperature dependences of the terms of Eq. 8 (e.g., changes in $\partial n_i/\partial T$ against those in $\varepsilon_i$) so as to reduce or substantially eliminate the temperature dependence of the device across a substantial portion or even all of its operating temperature range. The $\partial n_i/\partial T$ terms are set by material composition. The $\varepsilon_i$ terms and their temperature dependence can be controlled by the geometry of the planar waveguide and the diffractive elements thereof. Even if substantial temperature independence (i.e., athermalization) is not possible, it is typically possible to design a planar waveguide optical device so that the temperature derivative of one or more of its spectral and/or temporal characteristics is zero at some selected temperature within its operating range. Satisfying this condition will typically at least reduce the temperature dependence of the spectral/temporal characteristics, perhaps keeping them within a narrowed operating range over the operating temperature range.

As seen from the condition for the athermal operation (Eq. 8), even if the materials comprising a planar waveguide optical device do not have opposite signs of the thermo-optical coefficient ($\partial n_i/\partial T$), it is still possible to design an athermal device if terms $\varepsilon_i$ or $\alpha$ have signs opposite the sign of the thermo-optical coefficients of the materials. Such an approach may be particularly applicable in planar waveguides comprising various polymers or other materials where $\alpha$ and $\partial n/\partial T$ have opposite signs and comparable magnitudes. In addition, $\alpha$ in the last term of Eq. 8 may be adjusted to compensate for changes in the refractive indices using additional mechanical means. For example, a bi-metallic plate may be secured to the substrate of a planar waveguide device to create additional temperature-dependent mechanical stress and/or strain. In the above examples, the value of $\alpha$ for substantially athermal operation is defined by $$\alpha = -\left(\frac{1}{n_{mod}}\right)\sum_{i=1}^{k} \varepsilon_i \frac{\partial n_i}{\partial T}. \quad (9)$$

An alternative approach to controlling the thermal properties of a distributed diffractive structure is to vary the depth, width (in the propagation direction), and spacing (i.e., diffractive order) of the diffractive elements (collectively, the diffractive element geometry). For example, a first-order diffractive structure with diffractive-element width $\Lambda/2$ and period $\Lambda$ may be changed to second order (i.e. with period approximately $2\Lambda$), maintaining the same diffractive element width and operative device wavelength. Such a variation changes the mode field overlap with materials having various signs and magnitudes of the thermo-optic coefficients, thereby enabling modification of the temperature dependence of spectral and/or temporal characteristics of the diffractive element set. Such temperature dependences arising from sets of diffractive elements of various diffractive element configurations may be determined from measured material properties and multiple methods known in the art for analyzing the properties of optical signals in waveguide environments. In one example of controlling device temperature dependence through control of diffractive element geometry and spacing, both core and cladding materials may have the same sign of the thermo-optic coefficient, while a material having the opposite sign of the thermo-optic coefficient is incorporated only in the diffractive elements. In this case, the effective modal index will be (advantageously) sensitive to variations in diffractive element geometry (depth, width, and spacing/diffractive order). In another example, diffractive elements may comprise features of a layer of such a material (sign of the thermo-optical coefficient opposite that of the core and cladding materials) formed adjacent to or in the vicinity of the core guiding layer. Other examples may be designed and constructed that do not necessarily employ materials having oppositely signed thermo-optic coefficients, wherein the diffractive element geometry may nevertheless be manipulated for achieving a designed temperature dependence of spectral/temporal characteristics of the device.

Figure 2A:
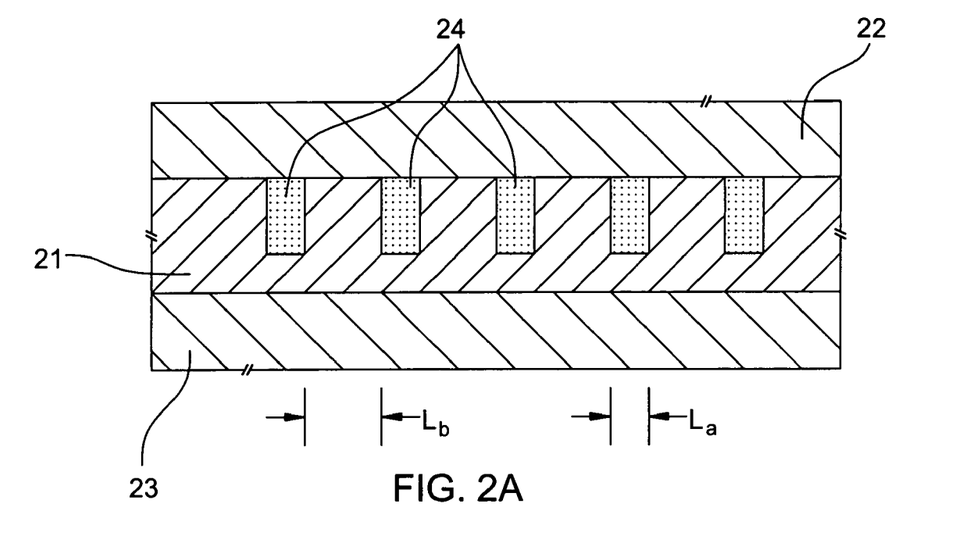
FIGS. 2A and 2B are schematic diagrams of exemplary temperature-compensated waveguides with diffractive elements.
Figure 2B:
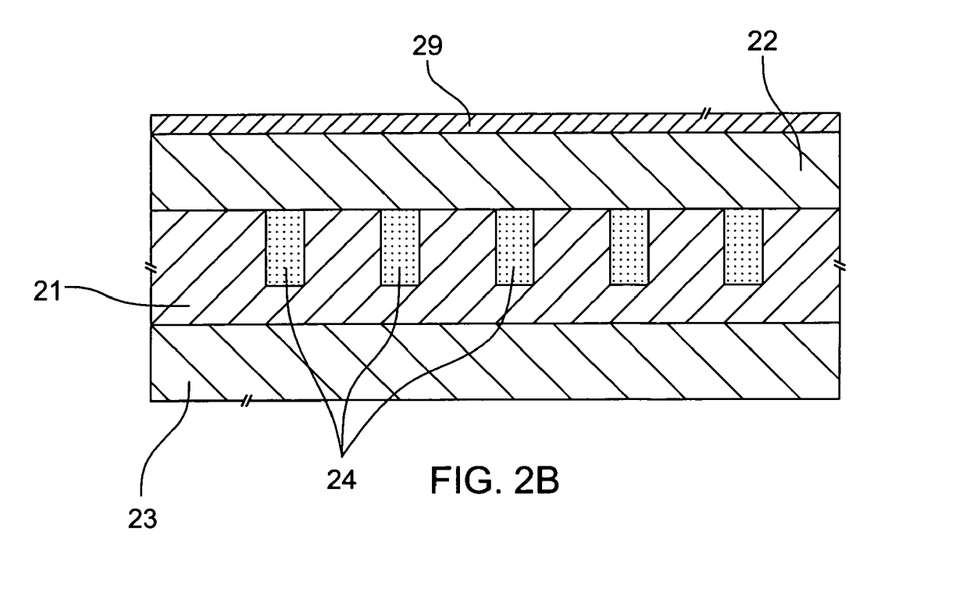

One calculational approach for configuring the geometry and spacing of diffractive elements so as to minimize temperature variation of device properties is formulated as follows. In a planar waveguide with a periodic perturbation, the Bragg resonance condition at wavelength $\lambda_{res}$ may be written as:

$$\lambda_{res} = \frac{2(n_{mod}^a L_a + n_{mod}^b L_b)}{m} \quad (10)$$

where $L_a$ and $L_b$ are lengths of a section of planar waveguide with effective refractive index $n_{mod}^a$ and $n_{mod}^b$, respectively, and m is a positive integer (diffraction order). A device cross-section showing core 21 and claddings 22 and 23, along with regions (a) and (b), is shown schematically in FIG. 2A. The lengths $L_a$ and $L_b$ correspond to the thickness (in the propagation direction) of a diffractive element 24 of waveguide core 21 (region a), and the distance between diffractive elements (region b), respectively. For simplicity only, we assume that the effective refractive index is uniform within regions (a) and (b). Effective optical pathlengths through regions (a) and (b) determined by waveguide calculational approaches known in the art may be substituted for the two optical pathlengths approximated by index times length in Eq. (10). Dependence of $\lambda_{res}$ on temperature T is obtained by differentiating Eq. (10) with respect to temperature:

$$\frac{\partial \lambda_{res}}{\partial T} = \frac{2}{m}\left(L_a \frac{\partial n_{mod}^a}{\partial T} + n_{mod}^a \frac{\partial L_a}{\partial T} + L_b \frac{\partial n_{mod}^b}{\partial T} + n_{mod}^b \frac{\partial L_b}{\partial T}\right) \quad (11)$$

resulting in a condition for substantially athermal operation given by $$\frac{\partial \lambda_{res}}{\partial T} = \frac{2L_a}{m}\left(\frac{\partial n_{mod}^a}{\partial T} + n_{mod}^a \alpha_a\right) + \frac{2L_b}{m}\left(\frac{\partial n_{mod}^b}{\partial T} + n_{mod}^b \alpha_b\right) = 0 \quad (12)$$

where $\alpha_a$ and $\alpha_b$ are defined as effective thermal expansion coefficients of the planar waveguide regions (a) and (b). Following the same procedure as described in Eqs. (6) to (9), one could calculate magnitudes of $\epsilon_i$ for regions (a) and (b) and calculate a ratio $L_a/L_b$ required for substantially athermal operation. Values of $L_a$ and $L_b$ may then be calculated from Eq. (10) using the following condition as an additional constraint to optimize reflectivity of the diffractive elements:

$$\lambda_{res}\left(\frac{1}{2}p + \frac{1}{4}\right) = n_{mod}^a L_a \quad (13)$$

where p=0, 1, 2 . . . . With m (the diffractive order; an integer) and Eq. (10) used to set operational wavelength, Eqs. (12) and (13) will generally not be simultaneously satisfied. However, free parameters may be adjusted to trade off temperature insensitivity (satisfying Eq. (12)) with diffractive element reflectivity (Eq. (13)). It should be noted that reflectivity of the diffractive element will vary with temperature due to the change in the refractive index at the interfaces of the diffractive element. This effect may be useful to control reflectivity of the device using a heating and/or cooling element. With controlled reflectivity the distributed diffractive device may be used as a variable optical attenuator (VOA) or a combination of VOA and wavelength-division multiplexer (VMUX). Such an exemplary embodiment is shown schematically in FIG. 2B, which includes a temperature controlling element 29.

In the exemplary embodiments disclosed herein and/or shown in the Figures, specific dimensions and materials may be disclosed. It shall be understood that use of such dimensions and materials is for illustrative purposes only, and should not be construed as limiting the scope of the present disclosure and/or appended claims. Planar waveguide optical apparatus according to the present disclosure may be implemented with a wide range of materials, including but not limited to polymers, plastics, various glasses, semiconductor materials and alloys, and so forth, forming single-mode and multi-mode planar waveguides with varying cladding and core arrangements and/or topologies, as long as materials with various thermo-optical coefficients, $\partial n_i/\partial T$, are used for forming the planar waveguide optical apparatus with the desired temperature dependence (or substantial independence). It shall also be understood that the detailed structure of the diffractive elements of the exemplary devices disclosed herein and/or shown in the Figures are for illustrative purposes only, and diffractive elements of a variety of configurations/geometries and formed in a variety of ways shall fall within the scope of the present disclosure and/or appended claims. Suitable fabrication processes may include but are not limited to stamping, lithographic scribing, injection molding, embossing, and so on. It shall be further understood that the fabrication processes of the disclosed exemplary planar waveguide optical devices are exemplary as well, and many other fabrication processes may be employed for forming various types of diffractive elements while remaining within the scope of the present disclosure and/or appended claims. Many examples of such are disclosed in the patent and patent applications cited hereinabove. Other fabrication processes that may be employed include but are not limited to flame hydrolysis deposition, laser evaporation deposition, spin-coating, injection molding, roll-pressing, UV-curing, stamping, and so forth, depending on the nature of the materials used to form the planar waveguide.

Figure 3A:
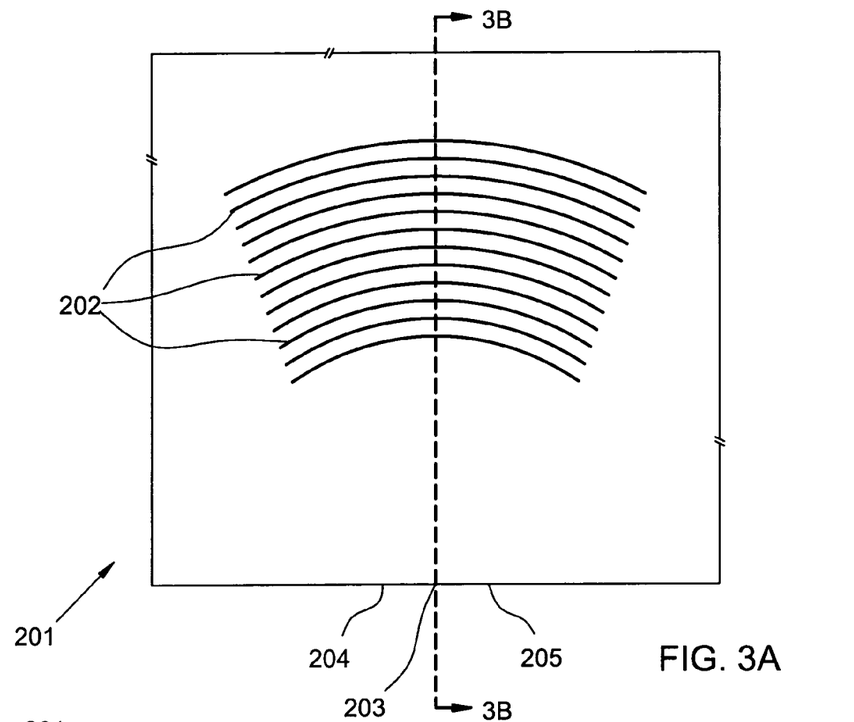
FIGS. 3A and 3B are schematic top and side views, respectively, of an exemplary temperature-compensated slab waveguide with diffractive elements.
Figure 3B:
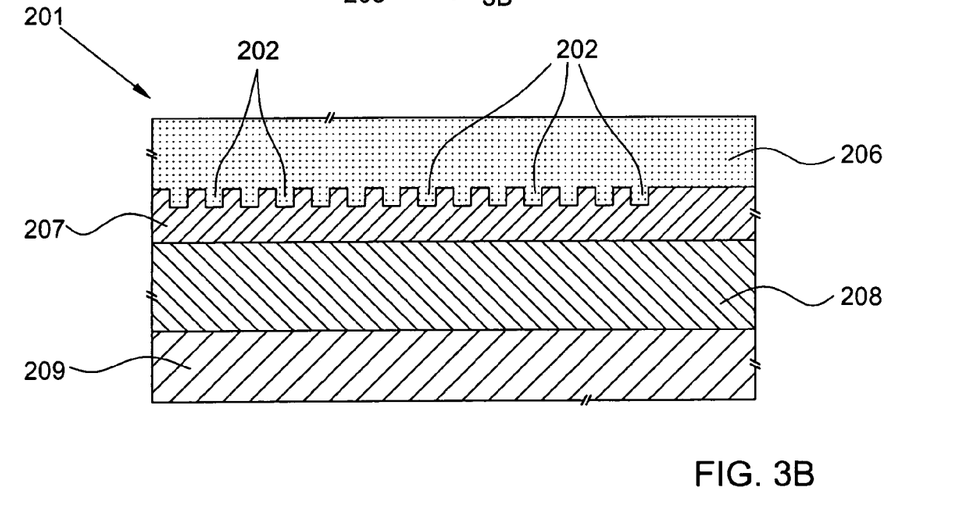

In the exemplary embodiment of a planar waveguide optical apparatus 201 shown in FIGS. 3A–3B (a planar waveguide spectral filter in this example), a slab waveguide comprises a 750 $\mu$m silicon substrate 209, a 15 $\mu$m silica (SiO$_2$) lower cladding 208 with refractive index 1.446 measured at 1530 $\mu$m wavelength and 35° C. temperature, a 3.3 $\mu$m Ge-doped silica core 207 with refractive index 1.457 measured at 1530 $\mu$m wavelength and 35° C. temperature, and upper cladding 206 comprising a co-polymer of polymethylmethacrylate (PMMA) and trifluoroethylmethacrylate (TFMA) with refractive index 1.441 measured at 1530 $\mu$m wavelength and 35° C. temperature. $\partial n/\partial T$ of the lower cladding and core materials is approximately $1.1 \times 10^{-5}/°$ C., while $\partial n/\partial T$ of polymer upper cladding is more than an order of magnitude larger with the opposite sign (about $-1.44 \times 10^{-4}/°$ C.). The core thickness is selected to minimize the thermally-induced wavelength shift of the spectral filter for a wavelength centered at about 1530 $\mu$m and temperature range from −5° C. to 75° C. The diffractive elements of the spectral filter are formed by grooves 202 etched into the core with depth of 0.25 $\mu$m and filled with the co-polymer used for the upper cladding 206. The diffractive element contours in this example are concentric arcs with a spatial period of 0.5274 $\mu$m, minimum radius of 2000 $\mu$m, maximum radius of 10000 $\mu$m, and groove width 0.25 $\mu$m. (It should be noted that FIGS. 3A and 3B comprise a schematic depiction of this embodiment. There are in fact many more diffractive elements than are actually shown, and the two views are not drawn to the same scale. The same is true of other Figures, particularly FIGS. 5A and 5B.)

Figure 4:
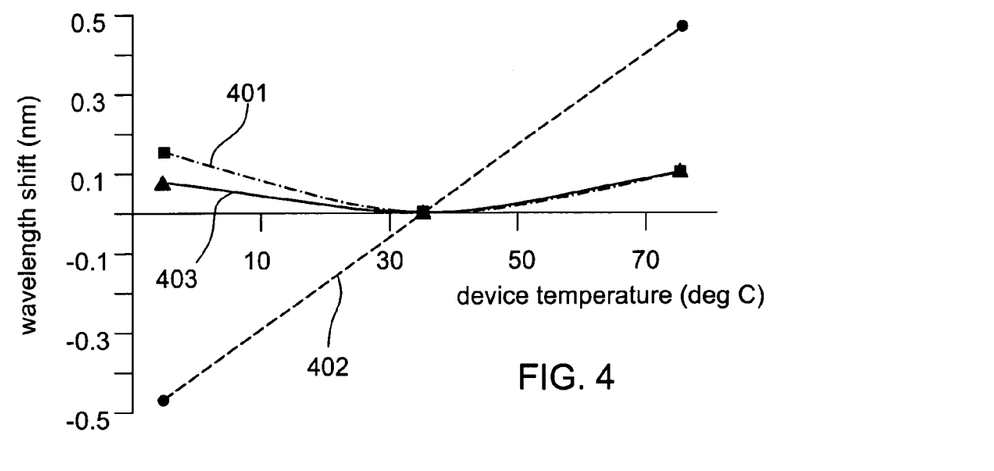
FIG. 4 shows calculated temperature-dependent spectral properties of waveguides with diffractive elements.

The optical ports 204 and 205 are positioned substantially symmetrically about the common center of curvature 203 of the diffractive element contours, and are separated by about 300 μm. Such structure may be produced by any suitable process, including (as an example, but not limited to) deposition of a core layer on an oxidized silicon wafer using standard chemical vapor deposition (CVD) process(es), etching grooves with reactive ion etching (RIE) process to form the diffractive elements 202, and application of the co-polymer by spin-coating and curing. FIG. 4 shows a comparison of simulated temperature-dependent resonance wavelengths ($\lambda_{res}$) shifts of the central wavelength of the filter's passband for this exemplary temperature-compensated spectral filter (curve 401) and for a similar filter with an upper cladding of silica (as in the prior art; curve 402). It is seen from FIG. 4 that the temperature-compensated filter (one cladding silica, the other polymer, with opposite signs for ∂n/∂T) exhibits less variation of the central wavelength with temperature relative to the prior art filter. There is a reduction in the range of the temperature-induced wavelength shift over the operating range of the device (−5° C. to 75° C.) by about a factor of three (at the extremes of the temperature range). At some midrange temperature $\partial\lambda_{res}/\partial T$ is zero, and any temperature-dependent variation will be minimized near this wavelength. The deviation of the central wavelength of curve a is larger in the lower part of the temperature range than in the higher part of the temperature range. This occurs due to an increasing fraction of the mode field distribution present in the upper cladding (the polymer) with reduction in the refractive index differential between the upper cladding and the core. Such reduction in the refractive index differential occurs with reduction in temperature, since with decreasing temperature the upper cladding refractive index is increasing while the refractive index of the core is decreasing. The opposite effect occurs at higher temperatures, reducing the fraction of the mode field distribution present in the upper cladding, but the effect is not as pronounced as at the lower temperatures, as seen from curve 401 of FIG. 4.

Figure 5A:
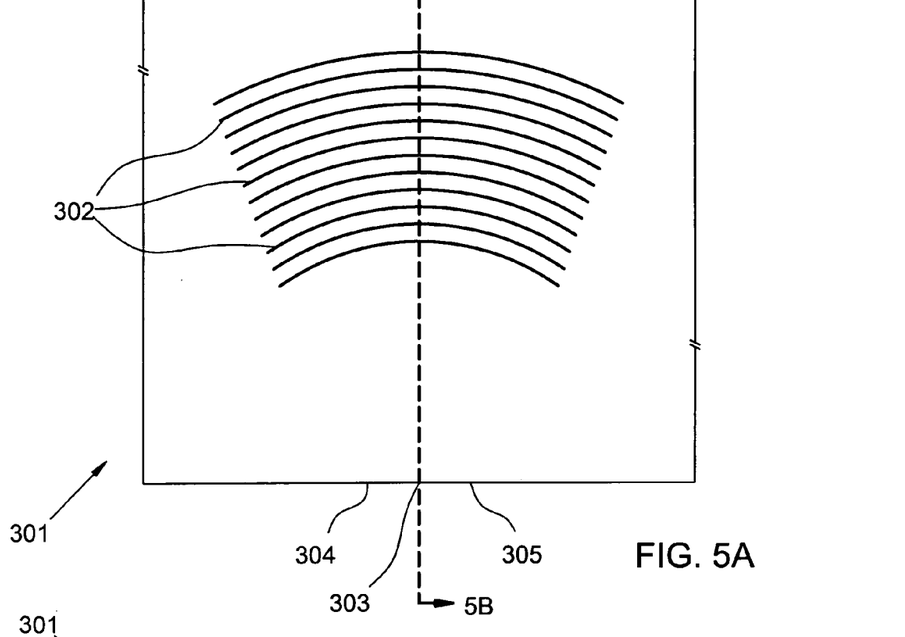
FIGS. 5A and 5B are schematic top and side views, respectively, of an exemplary temperature-compensated slab waveguide with diffractive elements.
Figure 5B:
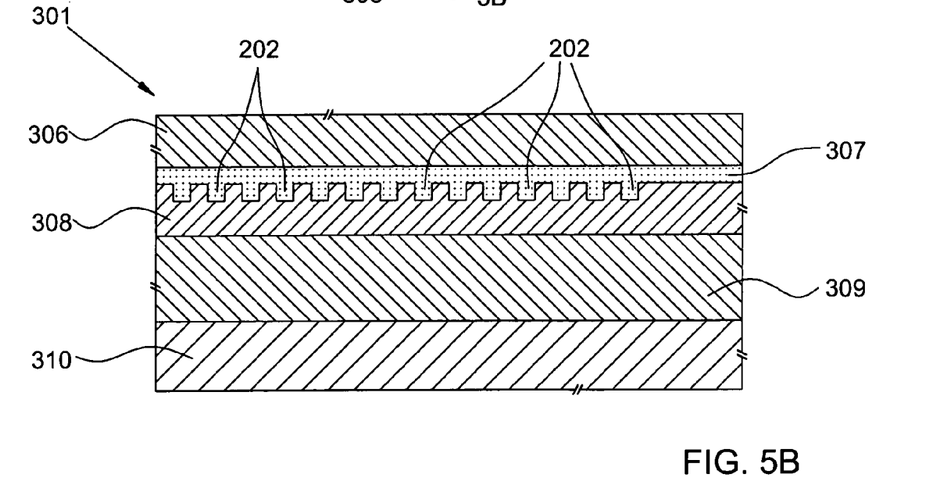

An exemplary embodiment of a planar waveguide spectral filter with improved temperature compensation is shown in FIGS. 5A–5B. The upper cladding of the filter comprises a 1.5 μm layer 307 of the PMMA-TFMA co-polymer adjacent the core 308 (filling the grooves 302 in this example) and a 1 mm silica layer 306 over the co-polymer layer. The rest of the filter structure is as disclosed in the previous exemplary embodiment (silicon substrate 310 and 15 μm silica lower cladding 309). Such structure may be produced in many ways, including but not limited to following the procedure described for the previous embodiment, and at the final step pressing a plate of fused silica on top of the co-polymer layer. The simulated dependence of the central wavelength shift for this embodiment is shown as curve 403 in FIG. 4. It is seen from the FIG. 4 that the center wavelength of this embodiment shifts over about half the range of the previous embodiment at −5° C. (0.074 nm versus 0.148 nm for the latter embodiment and the former, respectively). The presence of the silica layer 306 in the upper cladding reduces changes in the mode field distribution over a larger range of temperatures. An additional potential benefit of applying a silica layer over the co-polymer layer is increased reliability of the device, since the silica layer protects the latter layer from the environment.

Figure 6:
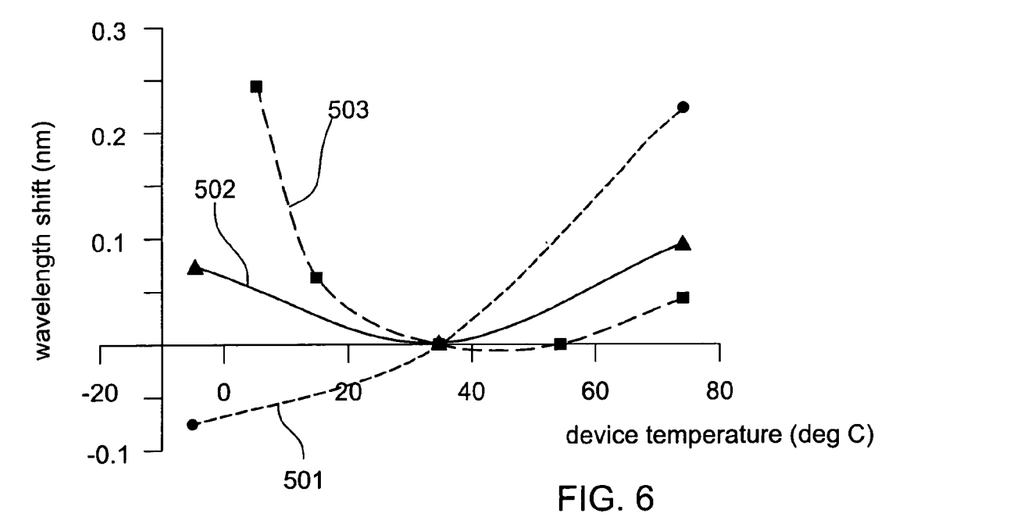
FIG. 6 shows calculated temperature-dependent spectral properties of waveguides with diffractive elements.

Simulation results in FIG. 6 illustrate how thicknesses of the core and co-polymer compensating layer may affect the resonance wavelength of the spectral filter fabricated according to this second exemplary embodiment. The ability to vary these two thickness parameters (core thickness and compensating layer thickness, compared to only one thickness variable, the core thickness, for the first exemplary embodiment) provides design flexibility for temperature compensation of the filter, enabling reduction of the temperature-dependent wavelength shift over a larger operating temperature range. The curves correspond to the examples with: 3 μm core thickness, 2 μm co-polymer layer thickness (curve 501); 3.3 μm core thickness, 1.5 μm co-polymer layer thickness (curve 502); and 4 μm core thickness, 2 μm co-polymer layer thickness (curve 503). A device corresponding to curve 502 is optimized for the specific material system and the temperature range of interest (−5° C. to 75° C.).

In another exemplary embodiment (FIG. 7), Eqs. (10–13) are applied to a specific example. In a single-mode planar waveguide, the core layer 31 (between cladding layers 32 and 33) has modal effective refractive index $n_{mod}^b$=1.5000 and thermo-optic coefficient 0.0001/° C. The core is etched through and filled with a material that has a modal effective refractive index $n_{mod}^a$=1.4900 and thermo-optic coefficient (−0.0003)/° C., thereby forming diffractive elements 34. The waveguide comprises segments of the core with length $L_b$ alternated with diffractive element segments of lower-index material of length $L_a$, forming a periodical structure with period ($L_a+L_b$). As a design constraint in this exemplary embodiment, a resonance wavelength for the diffractive element set is fixed at $\lambda_{res}$=1.5000 μm. As an additional constraint in this example, the thermal variation of the resonance wavelength is be minimized subject to providing maximum diffractive element reflectivity. Thermal expansion coefficients of the planar waveguide in regions (a) and (b) are assumed to be negligibly small. The athermal condition (Eq. (11)) yields $$L_b*0.0001/° \text{ C.}-L_a*0.0003/° \text{ C.}=0 \text{ and } L_b=3L_a. \tag{14}$$

Figure 7:
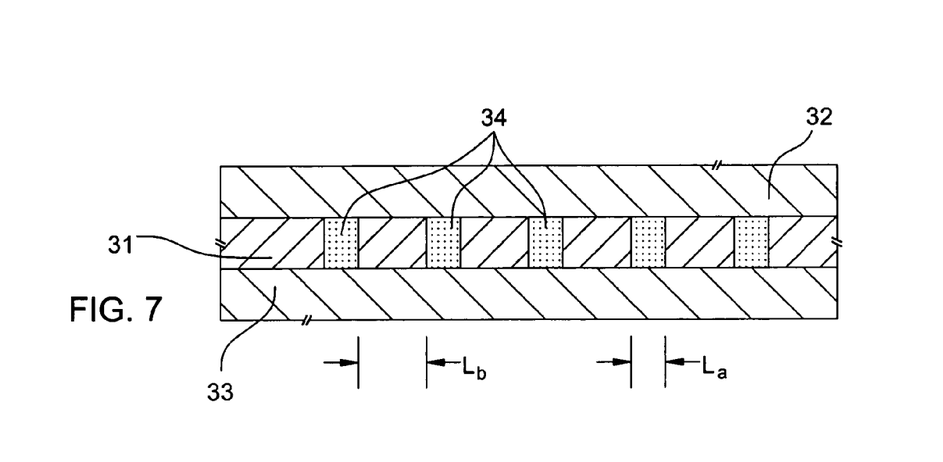
FIG. 7 is a schematic diagram of an exemplary temperature-compensated waveguide with diffractive elements.

Setting the diffractive element width $L_a$ to $\lambda_{res}/4n_{mod}^a$ for maximal reflectivity and then using Eq. (10) with various values of m to set $L_b$, we find that Eq. (14) is well satisfied for m=2 and hence, when constructed in that order, the device resonance will be highly temperature insensitive. More generally, the parameters m, $L_a$, and $L_b$ may be varied to optimize desired device properties including reflectivity and temperature sensitivity subject to constraints such as operating (resonance) wavelength. Such optimization procedures involving free and constrained parameters are known in the art.

Figure 8:
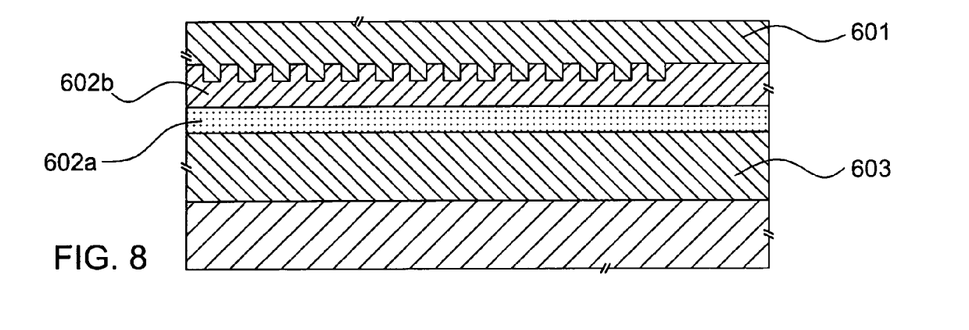
FIG. 8 is a schematic diagram of an exemplary temperature-compensated waveguide with diffractive elements.
Figure 9:
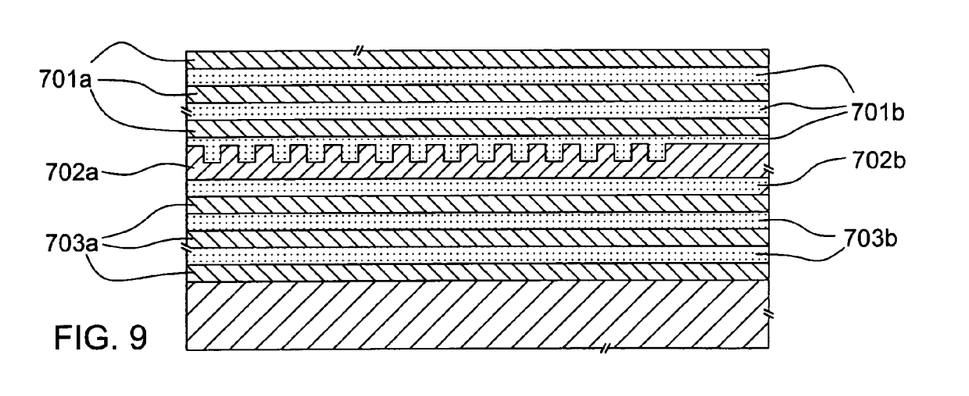
FIG. 9 is a schematic diagram of an exemplary temperature-compensated waveguide with diffractive elements.

It will be readily recognized that there are many other implementations of temperature-compensated planar waveguide optical apparatus, including spectral filters, temporal encoders, and other such devices. These may include but are not limited to: a planar waveguide optical apparatus with a core comprising at least two layers 602a and 602b of materials with opposite signs of ∂n/∂T (thermo-optic coefficient) between cladding layers 601 and 603 (see FIG. 8); and a planar waveguide optical apparatus wherein a slab waveguide comprises multiple sub-layers of materials with positive and negative signs of ∂n/∂T forming cladding layers (sublayers 701a/701b and sublayers 703a/703b) and/or the core layer (sublayers 702a/702b) to better preserve the optical mode distribution among the layers over a larger temperature range, or to achieve a pre-determined rate of temperature-dependent wavelength shift (see FIG. 9). Alternatively, layers with positive (+) and negative (−) signs of ∂n/∂T may alternate (sub-layer sequence −+−+−+−, etc.), or several layers with the same sign of ∂n/∂T alternating with one or several layers with the opposite sign of ∂n/∂T (e.g. sublayer sequence −+++−). Many various layer sequences involving many different materials with differing signs and magnitudes for ∂n/∂T may be employed while remaining within the scope of the present disclosure and/or appended claims.

In a thermally-compensated planar waveguide optical apparatus configured as a multiplexer or demultiplexer using sets of diffractive elements, individual diffractive element sets may be overlapped, overlaid, interleaved, and/or positioned sequentially in/on the planar waveguide, as disclosed in various of the above-cited priority documents. For a demultiplexer, polychromatic light enters a single input optical port. Multiple overlapped, overlaid, interleaved, or sequential diffractive element sets are employed, each of which has a diffractive element optical spacing (constant or otherwise) set to be reflective within one (or more) spectral channels, and each of which routes reflected light from the input optical port to one of multiple output optical ports. The multiple diffractive element sets collectively route light from the input optical port to the multiple output optical ports with a predetermined mapping of input spectral channels to output optical ports—each diffractive element set handles the mapping of one or more spectral channels to a specific output optical port. A multiplexer operates in a reverse manner from the demultiplexer.

As disclosed in various of the above-cited priority documents, the linear and/or curvilinear shape of the diffractive element contours in a temperature-compensated planar waveguide optical apparatus may be determined by a variety of standard optical imaging system design tools. Essentially, each diffractive element contour may be optimized to image the input port onto the output port in a phase coherent manner. Inputs to the design are the detailed structure of the optical input and output ports and their locations. Standard ray tracing approaches to optical element design may provide a diffractive contour at each optical distance into the planar waveguide that will provide an optimal imaging of the input port face onto the output port face. Simple curves may be employed as approximations of the fully optimized contours. Diffractive contours are spaced by an optical path difference (as described above) that provides for the field image of successive diffractive contours to be substantially in phase at a desired wavelength. If the overall response of the diffractive element set is to be apodized with phase modulation, the optical spacing of successive diffractive element contours may be controlled to provide required phase differences between diffracted components at the output port (as disclosed in various of the above-cited applications and patent). The diffracted amplitude arising from each diffractive element may be controlled by altering its width, depth, fill-factor, and so forth (as disclosed in various of the above-cited applications and patent).

An alternative approach to designing the diffractive element contours for a diffractive element set of a temperature-compensated planar waveguide optical apparatus is to calculate interference patterns between simulated fields entering the input port and exiting the output port in specific planar waveguide optical transverse modes, as disclosed in various of the above-cited priority documents. One approach is to consider the interference pattern of each mode of the input port having distinct field variation along the plane of the slab waveguide and calculating the interference pattern with a field coupled to a matching field pattern in the output port. The net pattern to be formed or written as a set of diffractive elements would be the sum of the individual calculated mode-to-mode interference patterns. In forming or writing a summed pattern for the diffractive element set, suitable discretization is applied as needed for any lithographic or UV exposure approach that is utilized for fabrication. It is also possible to form or write the diffractive element set based on a single input-mode-to-output-mode interference pattern to preferentially couple certain modes through the planar waveguide.

It is intended that equivalents of the disclosed exemplary embodiments and methods shall fall within the scope of the present disclosure. It is intended that the disclosed exemplary embodiments and methods, and equivalents thereof, may be modified while remaining within the scope of the present disclosure.

What is claimed is:

1. An optical apparatus, comprising a planar optical waveguide having at least one set of diffractive elements, the planar optical waveguide substantially confining in at least one transverse spatial dimension an optical signal propagating therein, wherein:
    each diffractive element set routes, between a corresponding input optical port and a corresponding output optical port, a corresponding diffracted portion of the optical signal propagating in the planar waveguide that is diffracted by the diffractive element set;
    the optical signal is successively incident on the diffractive elements of the set; and
    the planar waveguide comprises at least one material having thermo-optic properties chosen so as to yield a designed temperature dependence of at least one of spectral characteristics and temporal characteristics of the diffracted portion of the optical signal.

2. The apparatus of claim 1, wherein the planar optical waveguide is a slab waveguide confining in one transverse dimension an optical signal propagating in two dimensions therein, the planar optical waveguide comprises a core between first and second claddings, and the diffractive elements include either or both of linear diffractive elements and curvilinear diffractive elements.

3. The apparatus of claim 2, wherein the diffractive elements comprise material with ∂n/∂T of a sign opposite the sign of ∂n/∂T of at least one of the core and the cladding, and the core transverse dimensions and the diffractive element geometry are selected to yield the designed temperature dependence.

4. The apparatus of claim 3, wherein the core and the cladding comprise materials with ∂n/∂T of the same sign.

5. The apparatus of claim 3 further comprising a temperature controller for controlling reflectivity of the diffractive element set by altering the temperature of the planar waveguide.

6. The apparatus of claim 2, wherein the core, the first cladding, and the second cladding comprise materials with ∂n/∂T of the same sign, the second cladding includes a compensating layer with ∂n/∂T of the opposite sign, and the core thickness and the compensating layer position and thickness are selected to yield the designed temperature dependence.

7. The apparatus of claim 6, wherein the compensating layer is adjacent the core.

8. The apparatus of claim 2, wherein at least one of the first and second claddings comprises multiple material layers having differing values for ∂n/∂T, and the order and thicknesses of the layers are selected to yield the designed temperature dependence.

9. The apparatus of claim 8, wherein at least two of the multiple material layers comprise materials with ∂n/∂T of opposite signs.

10. The apparatus of claim 2, wherein the core includes multiple material layers having differing values for ∂n/∂T, and the order and thicknesses of the material layers are selected to yield the designed temperature dependence.

11. The apparatus of claim 10, wherein at least two of the material layers comprise materials with ∂n/∂T of opposite signs.

12. The apparatus of claim 2, wherein at least one of the core and the first cladding comprises silica-based material, and at least one of the core and the second cladding comprises thermo-optic polymer material.

13. The apparatus of claim 2, wherein the core and the first cladding comprise materials with ∂n/∂T of the same sign, the core and the second cladding comprise materials with ∂n/∂T of opposite signs, and the core thickness is selected to yield the designed temperature dependence.

14. The apparatus of claim 2, wherein the diffractive elements are arranged as focusing elements, and the corresponding input optical port and the corresponding output optical port are located at corresponding conjugate image points defined by the focusing elements.

15. The apparatus of claim 1, wherein the planar optical waveguide is a channel waveguide confining in two transverse dimensions an optical signal propagating in one dimensions therein, and the channel waveguide comprises a core surrounded by cladding.

16. The apparatus of claim 15, wherein the diffractive elements comprise material with ∂n/∂T of a sign opposite the sign of ∂n/∂T of at least one of the core and the cladding, and the core transverse dimensions and the diffractive element geometry are selected to yield the designed temperature dependence.

17. The apparatus of claim 16, wherein the core and the cladding comprise materials with ∂n/∂T of the same sign.

18. The apparatus of claim 16, further comprising a temperature controller for controlling reflectivity of the diffractive element set by altering the temperature of the planar waveguide.

19. The apparatus of claim 15, wherein the core and the cladding comprise materials with ∂n/∂T of the same sign, the cladding includes a compensating layer with ∂n/∂T of the opposite sign, and the core transverse dimensions and the compensating layer position and transverse dimensions are selected to yield the designed temperature dependence.

20. The apparatus of claim 19, wherein the compensating layer is adjacent the core.

21. The apparatus of claim 15, wherein the cladding comprises multiple material layers having differing values for ∂n/∂T, and the positions and transverse dimensions of the layers are selected to yield the designed temperature dependence.

22. The apparatus of claim 21, wherein at least two of the multiple material layers comprise materials with ∂n/∂T of opposite signs.

23. The apparatus of claim 15, wherein the core includes multiple material layers having differing values for ∂n/∂T, and the positions and thicknesses of the material layers are selected to yield the designed temperature dependence.

24. The apparatus of claim 23, wherein at least two of the material layers comprise materials with ∂n/∂T of opposite signs.

25. The apparatus of claim 15, wherein at least one of the core and the cladding comprises silica-based material, and at least one of the core and the cladding comprises thermo-optic polymer material.

26. The apparatus of claim 15, wherein the cladding comprises materials with ∂n/∂T of opposite signs, and the core transverse dimensions are selected to yield the designed temperature dependence.

27. The apparatus of claim 1, wherein thermo-optic properties are chosen so as to yield a temperature-dependent modal index that at least partly compensates for temperature-dependent mechanical dimensions of the planar waveguide and thereby yields the designed temperature dependence.

28. The apparatus of claim 27, wherein the planar waveguide is mounted on a substrate having thermal expansion properties chosen so as to yield the designed temperature dependence.

29. The apparatus of claim 1, wherein the optical apparatus functions as a spectral filter, and thermo-optic properties are chosen so as to yield a designed temperature dependence of a spectral profile of the spectral filter.

30. The apparatus of claim 29, wherein the spectral profile shifts within a range of less that about ±0.1 nm over a temperature range between about −5° C. and about 75° C.

31. The apparatus of claim 1, wherein thermo-optic properties and arrangement of materials comprising the planar waveguide are chosen so that a resultant temperature-dependent optical mode profile at least partly compensates for temperature-dependent bulk refractive indices of waveguide materials and thereby yields the designed temperature dependence.

32. The apparatus of claim 1, wherein thermo-optic properties and arrangement of materials comprising the planar waveguide are chosen so that a resultant temperature-dependent optical mode profile, temperature-dependent bulk refractive indices of waveguide materials, and temperature-dependent mechanical dimensions of the planar waveguide yield the designed temperature dependence.

33. The apparatus of claim 1, wherein the designed temperature dependence includes substantial independence with respect to temperature of at least one of the spectral characteristics and the temporal characteristics of the diffracted portion of the optical signal over an operating temperature range.

34. The apparatus of claim 1, wherein a derivative with respect to temperature of at least one of the spectral characteristics and the temporal characteristics of the diffracted portion of the optical signal is zero at a selected temperature within an operating temperature range.

35. The apparatus of claim 1, wherein the designed temperature dependence includes a designed variation with respect to temperature of at least one of the spectral characteristics and the temporal characteristics of the diffracted portion of the optical signal.

36. The apparatus of claim 1, wherein thermo-optic properties are chosen so as to yield a designed temperature dependence of a waveguide modal index, thereby yielding the designed temperature dependence.

37. The apparatus of claim 1, wherein the chosen thermo-optic material is present in the planar waveguide in regions thereof where an optical signal propagating therein interacts with both the thermo-optic material and the set of diffractive elements.

38. The apparatus of claim 1, wherein the optical apparatus functions as a temporal encoder, and thermo-optic properties are chosen so as to yield a designed temperature dependence of the temporal characteristics of the temporal encoder.

39. An optical apparatus, comprising a planar optical waveguide having at least one set of diffractive elements, the planar optical waveguide substantially confining in at least one transverse spatial dimension an optical signal propagating therein, wherein:

each diffractive element set routes, between a corresponding input optical port and a corresponding output optical port, a corresponding diffracted portion of the optical signal propagating in the planar waveguide that is diffracted by the diffractive element set;

the optical signal is successively incident on the diffractive elements of the set; and the planar waveguide further comprises means for yielding a designed temperature dependence of at least one of spectral characteristics and temporal characteristics of the diffracted portion of the optical signal.

40. The apparatus of claim 39, wherein the means for yielding the designed temperature dependence is present in the planar waveguide in regions thereof where an optical signal propagating therein interacts with both the set of diffractive elements and the means for yielding the designed temperature dependence.

41. The apparatus of claim 39, wherein the planar optical waveguide is a slab waveguide confining in one transverse dimension an optical signal propagating in two dimensions therein, the planar optical waveguide comprises a core between first and second claddings, and the diffractive elements include either or both of linear diffractive elements and curvilinear diffractive elements.

42. The apparatus of claim 39, wherein the planar optical waveguide is a channel waveguide confining in two transverse dimensions an optical signal propagating in one dimensions therein, and the channel waveguide comprises a core surrounded by cladding.

43. The apparatus of claim 39, wherein the means for yielding the designed temperature dependence exhibits thermo-optic properties chosen so as to yield a designed temperature dependence of a waveguide modal index, thereby yielding the designed temperature dependence.

44. The apparatus of claim 39, wherein the means for yielding the designed temperature dependence exhibits thermo-optic properties chosen so as to yield a temperature-dependent modal index that at least partly compensates for temperature-dependent mechanical dimensions of the planar waveguide and thereby yield the designed temperature dependence.

45. The apparatus of claim 39, wherein the means for yielding the designed temperature dependence exhibits thermo-optic properties and arrangement of materials chosen so that a resultant temperature-dependent optical mode profile at least partly compensates for temperature-dependent bulk refractive indices of waveguide materials and thereby yields the designed temperature dependence.

46. The apparatus of claim 39, wherein the means for yielding the designed temperature dependence exhibits thermo-optic properties and arrangement of materials chosen so that a resultant temperature-dependent optical mode profile, temperature-dependent bulk refractive indices of waveguide materials, and temperature-dependent mechanical dimensions of the planar waveguide yield the designed temperature dependence.

47. The apparatus of claim 39, wherein the designed temperature dependence includes substantial independence with respect to temperature of at least one of the spectral characteristics and the temporal characteristics of the diffracted portion of the optical signal over an operating temperature range.

48. The apparatus of claim 39, wherein a derivative with respect to temperature of at least one of the spectral characteristics and the temporal characteristics of the diffracted portion of the optical signal is zero at a selected temperature within an operating temperature range.

49. The apparatus of claim 39, wherein the designed temperature dependence includes a designed variation with respect to temperature of at least one of the spectral characteristics and the temporal characteristics of the diffracted portion of the optical signal.

50. The apparatus of claim 39, wherein the optical apparatus functions as a spectral filter, and the means for yielding the designed temperature dependence exhibit thermo-optic properties chosen so as to yield a designed temperature dependence of a spectral profile of the spectral filter.

51. The apparatus of claim 39, wherein the optical apparatus functions as a temporal encoder, and the means for yielding the designed temperature dependence exhibit thermo-optic properties chosen so as to yield a designed temperature dependence of the temporal characteristics of the temporal encoder.

* * * * *